Sept. 20, 1960   M. ABRAMS   2,952,938
COMBINED VAPOR, MOISTURE AND INSECT PROTECTION OF BUILDINGS
Filed Feb. 4, 1957
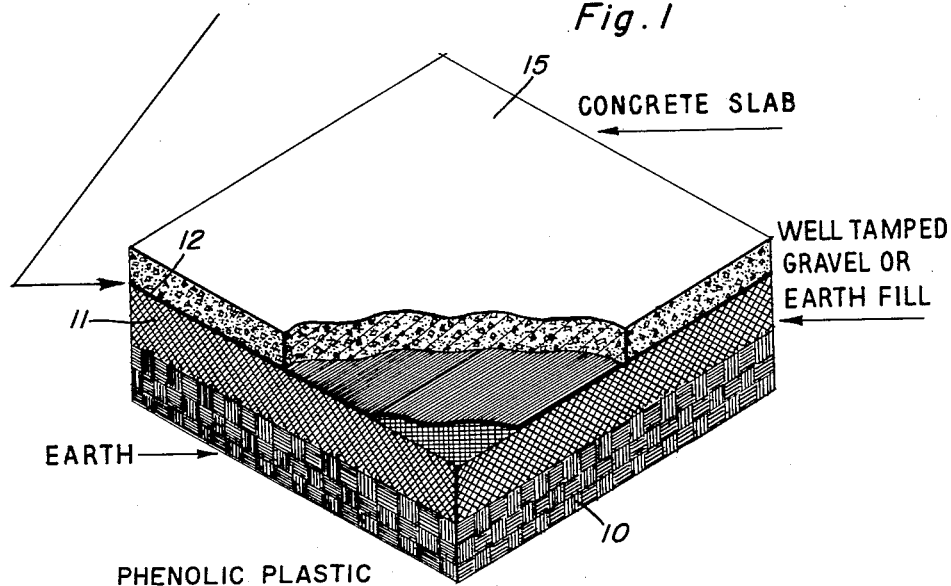
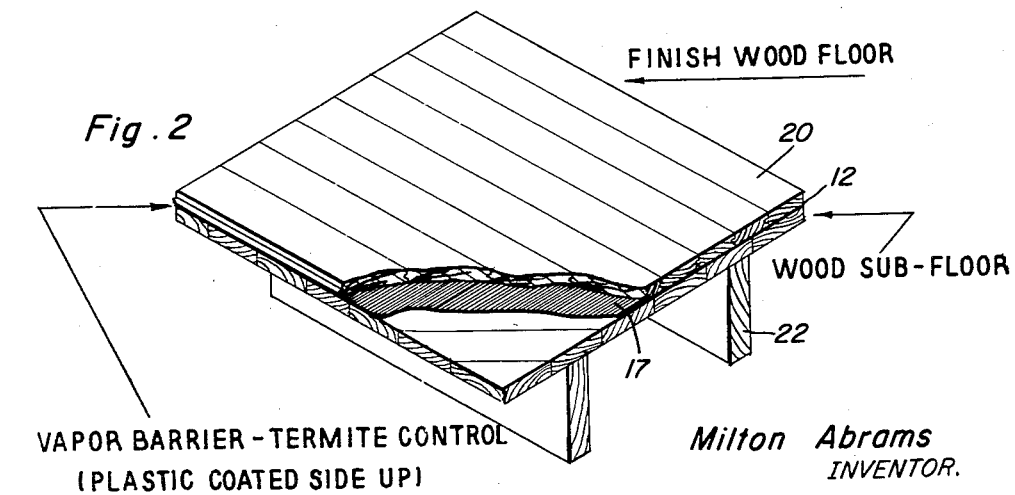
Milton Abrams
INVENTOR.

United States Patent Office 2,952,938
Patented Sept. 20, 1960

2,952,938

COMBINED VAPOR, MOISTURE AND INSECT PROTECTION OF BUILDINGS

Milton Abrams, Charleston, S.C.
(9035 SW. 17th Terrace, Miami, Fla.)

Filed Feb. 4, 1957, Ser. No. 637,953

10 Claims. (Cl. 43—131)

This invention relates to protection of buildings against damage resulting from the contact with the soil and it has for its particular object to provide a method and means for a combined protection which includes protection against vapors, against moisture and against insects, especially against destructive species such as termites.

At present protection against the various damaging influences or factors is obtained by separate protective means or steps. Protection against moisture in most cases is, for instance, obtained by means of a layer of building felt inserted between the soil and the floor elements, such as concrete slabs, which are usually placed on a well tamped gravel or earth fill on the soil. The protection against termites however is applied in such a case by spraying an insecticide, such as chlordane crystals on the soil or on the fill before placing the felt on the soil. While this operation seems to be a simple one it entails, on account of the toxicity of the insecticide, the employment of a special technical expert handling the insecticide by means of a special equipment. Similar conditions prevail when constructions other than those above described are used.

The invention consists in a method and system using an element so prepared that it simultaneously forms a vapor barrier, a moisture barrier and a termite barrier which therefore keeps all the damaging influences which originate in the soil from penetrating into the building.

According to the invention a building felt layer is used which is covered on one side with a coating of a synthetic resin and which may or may not contain a metal power such as aluminum powder. This felt is impregnated with the insecticide and solvent, and is placed with the layer of resinous plastic uppermost between the floor elements and the soil. The felt and the layer of resinous plastic together protect completely against moisture and against the penetration of vapors or odors. The insecticide with which the felt is impregnated spreads downwardly when the felt is placed on the fill or soil, any spreading in upward direction being inhibited by the layer of resinous plastic. The spreading of the insecticide through the fill or through the soil produces a zone below the felt which is impassable for termites and other insects which are killed when coming into contact with the insecticide.

This method of providing a combined protection essentially concentrated in one element which is suitably equipped with all the means required for protection and is suitably placed so as to be able to exercise this protective action, at the same time limiting some of this action to the desired zones, has many advantages. Among these advantages are the simplification of the operation of the builder, due to the fact that the impregnated felt may be handled by workmen not familiar with the handling of chemicals, gloves or frequent washing of hands being the sole protection desirable during handling; further the phenolic resin layer of the building felt when turned upwardly protects not only the floor elements against the penetration of vapors and gives additional protection against moisture but it also guards against spreading of the toxic insecticide into the floor element. One of the main advantages is further that the felt, loaded with insecticide, is on the underside in contact with the soil or with the fill put on the soil and acts as a source of insecticide which spreads within the fill or soil and forms a protective zone or layer therein which, after some time, forms an independent protective means for the building. The action of the insecticide is thus not limited to the felt and is not dependent on the integrity of the felt. The felt can be loaded with insecticide sufficiently to cause such spreading in the porous fill or soil while the phenolic resin layer on the other hand will prevent the spreading of the insecticide effectively towards the floor elements which may, for instance, consist of concrete slabs or of other floor elements placed on the felt.

Felt or other fabrics impregnated with an insecticide have been proposed in some instances in connection with buildings and especially in connection with roofing felts. However, the impregnation of such a roofing felt or other fabric is made only to the extent of protecting the felt itself so as to make it insect proof and may not be attacked and destroyed by insects. The insect protection has no ulterior function. Therefore, if the felt is torn or destroyed at places insect protection and in most cases also other protection ceases. The integrity of the felt or other fabric is thus an indispensable factor, whereas according to the invention as long as the phenolic layer lasts vapor and moisture protection remains complete and also the insect protection remains complete when the layer, as above stated, is so placed and so loaded that the insecticide can penetrate sufficiently into the soil. It will then produce an active zone which will remain active even if the felt has been torn or partly destroyed.

The main object of the invention is thus to produce an element having waterproofing, vapor-proofing, and insecticidal properties; a further main object consists in so preparing this element that it acts as a directive source of an insecticide which is adapted to spread the insecticide in a definite direction within surrounding materials while excluding spreading of the insecticide in other directions.

A further object of the invention consists in producing an element which forms a permanent barrier against insects and especially against termites which is independent of the integrity of the protective material and which keeps the toxic material limited to zones which are the most effective in achieving this object.

The invention is illustrated in the accompanying drawing which shows two applications of the invention. It is to be understood that the invention and its application is shown by way of example only and that the figures in the drawing are merely illustrative and do not in any way limit the invention to the applications which are shown. The figures intend to illustrate the principle of the invention and the best modes of applying said principle. Other methods of applications will be more or less obvious to the expert in this field so that a departure from the modes of application illustrated is not necessarily a departure from the principle of the invention.

In the drawing:

Figure 1 is a perspective sectional view of the application of the invention to a so-called "slab on fill" floor of a building.

Figure 2 is a perspective view partly in section of the application of the invention to a wooden floor of a building.

Figure 3 is a cross-section through the protective element.

The invention will be described with reference to the two examples illustrated in the drawings, one being the construction usually termed "slab on fill" construction in which building felt with tar-mopped joints is placed directly under a concrete slab, while the other example shows the protective material as being inserted between the subfloor and the finished floor-on-wood-construction above grade. However it will be clear to the expert skilled in this field that these particular methods are not necessarily the only ones in which the element described is useful and that therefore elements such as described may be also used in other locations.

With respect to termite control the main point is clearly to break the line of communication or contact between the soil which is the road of access for termites to wood.

The example shown in Figure 1 illustrates the so-called "slab on fill" method; the conventional method of this type consists in preparing above the ground 10 a "fill" 11 consisting of well tamped gravel or earth. On this fill a felt layer 12 is placed and above the felt layer a concrete slab 15 may be directly poured.

According to the invention the felt layer is of a particular type and construction. It consists of the conventional building felt material 16 which is, however, in this case covered with a layer of phenolic resin 17 and which is moreover impregnated with a suitable insecticide during the production process of the felt. The felt so prepared is then placed on the fill with the phenolic resin layer pointing towards the upper side.

The building felt itself may be of the conventional type but undergoes the special coating and impregnation or process before being used.

The coating process is not part of the invention. The coating may be applied using the so-called "knife coating" method with the knife adjusted so as to have the proper clearance. The preferred method to apply the coating to the felt is however a reverse roller coater process, this process being similar to the transfer of ink or paint to a continuous web in a rotary printing machine. The coating may consist of any resinous plastic which is impermeable to vapors and liquids; the composition of this layer therefore can vary considerably. One example is stated below.

After the felt has been coated it is either sprayed with insecticide or passed through a bath over and under guide rollers which contain the insecticide. This process must be so regulated that the felt is loaded with a quantity of insecticide which will cause the insecticide, when the felt is in contact with the fill material, to spread through the material. The resinous coating on one side of the felt will however prevent the insecticide from spreading on that side of the felt which is covered by the coating.

The felt after having been so treated is wound into rolls of suitable length while still damp or wet and is packaged in tightly fitting polyethylene bags.

In Figure 2 of the drawing the felt 12 with its coating turned towards the upper side is shown as being inserted between a wooden subfloor 22 and a wooden finished floor 20. The impregnated felt 12 acts again as a barrier for vapor and moisture and as a source and carrier of the insecticide. The insecticide with which the felt is impregnated will again spread to the adjacent layers of the subfloor construction forming a barrier for termites and other insects which is not dependent on the integrity of the felt. The insecticide however does not penetrate into the wooden finish floor on account of the layer of resinous plastic so that the toxic material is kept from that part of the construction where such a substance is undesirable.

*Example 1*

The following example is purely illustrative as numerous other coatings of resinous plastics can be formulated which will fulfil exactly the same purpose. It is to be understood that the composition of the coating is not a part of this invention. A suitable formula for the composition with which the felt is coated is the following:

|  | Percent of parts by weight |
|---|---|
| Vinylite resin XYSG | 12 |
| Bakelite BV9700 | 12 |
| Aluminum powder | 8.5 |
| Castor oil | 12 |
| Flexol TOF | 3.0 |
| Synasol #1 | 26.0 |
| Solvesso #1 | 8.0 |
| Fillers | 18.5 |
| Total | 100.0 |

Vinylite XYSG is a product of the Carbide and Carbon Chemicals Company and is a high molecular weight polyvinyl butyral resin having a specific gravity of 1.12. It contains 54.4% vinyl, 38.3% butyraldehyde, 0.3% acetate and 7.0% hydroxyl. A similar product is Vinylite XYHL made by the Bakelite Corporation and a resin named butvar made by Monsanto Chemical Company.

Bakelite BV9700 is a high molecular weight thermosetting phenol formaldehyde condensation product manufactured by Carbide and Carbon Chemicals Company.

Solvesso #1 is an aromatic hydrocarbon and consists chiefly of toluene and it has a boiling range of 200° to 270° F., and is manufactured by the Standard Oil Company.

Flexol TOF consists of tri-ethylhexyl phosphate and is a plasticiser having the specific gravity 0.926 boiling point of 220° C. (5 mm. Hg), flash point of 220° F. It is insoluble in water and compatible with vinyl butyral copolymers.

Synasol is a proprietary 190 proof denatured alcohol composed of 100 parts denatured ethyl alcohol, 5 parts of ethyl acetate, 1 part of aviation gasoline; it has a specific gravity of 0.816 and a boiling point of 70 to 80° C., a flash point of 70° F.

The castor oil is of a technical grade.

The fillers may consist of clay, of silica gel, diatomaceous earth, calcium carbonate and of similar materials.

As above stated the coating may be applied either by the knife coating method or preferably by the so-called reverse roller coater. The last named method has the advantage of reducing tension on the felt material which is very heavy when the knife coating method is used.

As an example it may be stated that the building felt is of 58 points thickness (approximately 1/20 in.). The coating which is applied on one side of the felt is applied to the extent of 0.035 lb./sq. ft.

With respect to the insecticides used to impregnate the felt, it will be clear that the proper insecticide must be chosen for protection from the particular species of insect against which a barrier is desired. The insecticide must have additional properties in order to be useful in the way described, such as being unaffected by moisture and by alkaline substances. It should also be non-volatile and should maintain its active condition for very long, practically indefinite, periods of time. Suitable insecticides of good effect against termites, which are the most damaging insects against which buildings have to be protected, include:

Aldrin (1,2,3,4,10,10 hexachloro-1,4,4a,5,8,8a hexahydro 1,4,5,8 dimethano-naphthalene)
Allethrin (allylhomologue of cinerin I)
Benzene hexachloride
Bis (p-chlorophenoxy) methane
Chlordane (octachloro-4,7-methano-tetra-hydroindane)
Lindane (gamma-1,2,3,4,5,6 hexachloro-cyclohexane)

Dieldrin (5,6,7,8,9,9 hexachloro-2,3 epoxy-1,2,3,3a,4,5, 8,8a octahydro-1,4,8 dimethano naphthalene)
Pentachlorophenol
TDE (1,1 dichloro-2,2, bis (p-chlorophenylethane)
Toxaphene (chlorinated camphene)

Pentachlorophenol and dieldrin have been widely used against termites. The insecticide preferred for the purposes of the invention is dieldrin because it is unaffected by moisture and by alkalies. This last named property is especially important where the felt is to be in contact with fills, with soils or with concrete. Moreover dieldrin is completely odorless and is nonvolatile.

Another preferred insecticide is chlordane which is somewhat less powerful than dieldrin but is likewise a very suitable insecticide especially in the case of termites.

The insecticide must be used in a solution. The following examples of such solutions have been found to be practically useful.

*Example 2*

|  | Percent |
|---|---|
| Dieldrin | 0.1 to 1.0 |
| Solvesso #3 | 99 to 99.9 |

Solvessor #3 is an aromatic naphtha of an API gravity of 29.5, specific gravity 60/60° F. is 0.879, A.S.T.M. distillation, I.B.P. 174° C., end points 187° C.

*Example 3*

|  | Percent |
|---|---|
| Dieldrin | 0.1 to 1.0 |
| Super-Sol | 99 to 99.9 |

Super-Sol is a product of the Pennsylvania Refining Company and is a highly refined hydrocarbon solvent of an API gravity 53/55, specific gravity at 60/60° F. is 0.759 to 0.767, the Saybolt viscosity at 100° F. is 29.5 to 30.5 seconds, flash point C.O.C. 130 to 135° F., A.S.T.M. distillation, I.B.P. 330 to 340° F., end point 430 to 440° F.

*Example 4*

|  | Percent |
|---|---|
| Dieldrin | 0.1 to 0.5 |
| Heavy mineral oil | 99.5 to 99.9 |

The mineral oil in this case was "Clearteck," a product of the Pennsylvania Refining Company. This is a heavy minearl oil the specific gravity at 60/60° F. is 0.875 to 0.905, Saybolt viscosity at 100° F. 300 to 310 seconds.

In order to prepare the solution the heavy mineral oil should be heated to 70° C. and the dieldrin should be added with agitation.

*Example 5*

|  | Percent |
|---|---|
| Dieldrin | 0.1 to 0.7 |
| Kerosene | 99.3 to 99.9 |

The kerosene has the specific gravity of approximately 0.8, the distillation range approximately 200 to 350° F.

The building felt provided with the vinylite-phenolic-resin coating and impregnated with the solution of dieldrin when placed with the phenolic layer on top in the manner described should practically provide a complete combined protection gainst the penetration of moisture, of vapors and of termites or other insects for the lifetime of the building. That this protecion is lasing must be concluded from the manufacturer's experiments with dieldrin which are said to indicate that dieldrin does not change or lose its insecticidal properties in the course of many years.

The combined protection of the building as well as the fact that the coating permits penetration of the insecticide in one direction only produces the unique combination of advantages which entails a low cost protection as well as an indefinite duration of the protection.

As will be clear from the above the invention is not necessarily associated with the examples which have been stated and that many of the materials used may be replaced by equivalent materials without in any way departing from the essence of the invention as defined in the annexed claims.

What is claimed as new is as follows:

1. An improved building construction of the character described comprising a base section, a sheet element underlying said base section and including a vapor barrier defining upper layer confronting said base section and a lower layer having as an impregnant therefor a termite toxic insecticide, and a termite toxic zone disposed along and projecting from said insecticide impregnated layer, and established by said insecticide impregnated layer.

2. An improved building construction of the character described comprising a base section, a sheet element underlying said base section and including a vapor barrier defining upper layer confronting said base section and a lower layer having as an impregnant therefor a termite toxic insecticide, and a termite toxic zone disposed along and projecting from said insecticide impregnated layer, and sustained by said insecticide impregnated layer.

3. An improved slab on grade building construction of the character described comprising a base slab member, a barrier sheet underlying said slab member and including a vapor barrier defining upper layer confronting said base slab and a ground confronting underlayer having as an impregnant therefor a termite toxic insecticide, and a termite toxic zone disposed along and projecting into the ground from said insecticide bearing underlayer and being established by insecticide migrating from said underlayer.

4. A ground born building construction comprising an insecticide layer having as an impregnant therefor a termite toxic insecticide having a face thereof provided with a vapor impervious coating and adapted to confront the building, the other face of said insecticide carrying layer adapted to confront the ground, and a termite toxic zone established in the ground by said insecticide carrying layer.

5. In combination with a ground supported building structure including a base member, a barrier element in sheet form underlying said base member and comprising a layer having as an impregnant therefor a termite toxic insecticide and a substantially vapor impervious layer overlying a face of said insecticide impregnated layer between said base member and ground, and a termite toxic insecticidal zone projecting outwardly from and established by said insecticide impregnated layer.

6. A termite barrier element in sheet form comprising a layer having as an impregnant therefor a termite toxic insecticide adapted to be disposed on the ground, provided with a substantially vapor impervious layer along a face thereof, the concentration and quantity of insecticide carried by said insecticide impregnated layer being sufficient when facing and in contact with the ground to establish a termite toxic barrier zone penetrating the ground underlying said insecticide impregnated layer.

7. An improved barrier sheet for use in building construction and the like comprising an absorbant layer of felt material having as an impregnant therefor a termite toxic insecticide embodied in a vehicle and a vapor impervious layer coating a face of said felt layer, said insecticide being present in a quantity and concentration sufficient upon contact with the ground to release an amount thereof adequate to establish and maintain a termite toxic insecticidal zone in said ground adjacent to the uncoated face of said felt layer.

8. A barrier sheet in accordance with claim 7, wherein said insecticide is selected from the group consisting of aldrin, allethrin, benzene hexachloride, bis (p-chlorophynoxy) methane, chlordane, dieldrin, lindane, pentachlorophenol and toxaphene.

9. A barrier sheet in accordance with claim 7 wherein said vehicle is a hydrocarbon solvent.

10. A barrier sheet in accordance with claim 7 wherein said vehicle is a mineral oil and said insecticide is dieldrin.

References Cited in the file of this patent

UNITED STATES PATENTS

| | | |
|---|---|---|
| 859,636 | Welch | July 9, 1907 |
| 1,013,514 | Rand | Jan. 2, 1912 |
| 2,119,804 | Crooks | June 7, 1933 |
| 2,143,043 | Wexler | Jan. 10, 1939 |
| 2,196,387 | Elmendorf | Apr. 9, 1940 |
| 2,315,772 | Closs | Apr. 6, 1943 |
| 2,842,892 | Aldridge et al. | July 15, 1958 |

OTHER REFERENCES

Handbook No. 72, published 1955 by the Forest Products Laboratory, U.S. Dept. of Agriculture, page 392.

Termites and Termite Control, by Kofoid et al., page 378. Published 1946 by University of California Press, Berkeley, Calif.